(12) United States Patent
Gafarov et al.

(10) Patent No.: US 11,098,810 B2
(45) Date of Patent: Aug. 24, 2021

(54) RAPID RESPONSE TRIGGER

(71) Applicants: Eduard Gafarov, Long Beach, CA (US); Sergei Zakharov, Long Beach, CA (US)

(72) Inventors: Eduard Gafarov, Long Beach, CA (US); Sergei Zakharov, Long Beach, CA (US)

(*) Notice: Subject to any disclaimer, the term of this patent is extended or adjusted under 35 U.S.C. 154(b) by 47 days.

(21) Appl. No.: 16/268,365

(22) Filed: Feb. 5, 2019

(65) Prior Publication Data

US 2020/0248826 A1 Aug. 6, 2020

(51) Int. Cl.
*F16K 17/04* (2006.01)

(52) U.S. Cl.
CPC ................. *F16K 17/0486* (2013.01)

(58) Field of Classification Search
CPC ..... Y10T 137/86984; Y10T 137/87378; F16K 15/066; F16K 1/306; F16K 17/0486
USPC ........................................................ 251/321
See application file for complete search history.

(56) References Cited

U.S. PATENT DOCUMENTS

| | | | | |
|---|---|---|---|---|
| 698,530 | A * | 4/1902 | Mason | F16K 21/04 251/50 |
| 2,213,488 | A * | 9/1940 | Dowrick | G10K 5/00 137/630.15 |
| 2,370,182 | A * | 2/1945 | Morrow | F16K 21/14 137/630.15 |
| 2,477,237 | A * | 7/1949 | Carr | F16K 1/34 137/596.1 |
| 3,213,887 | A * | 10/1965 | Angelery | F16K 39/04 137/630.15 |
| 5,000,516 | A * | 3/1991 | Kolle | E21C 37/12 102/329 |
| 8,312,896 | B2 * | 11/2012 | Baltz | B05B 7/12 137/630.15 |
| 9,822,893 | B2 | 11/2017 | Kunau | |

* cited by examiner

*Primary Examiner* — Reinaldo Sanchez-Medina
*Assistant Examiner* — Nicole Gardner
(74) *Attorney, Agent, or Firm* — Fulwider Patton LLP (57) ABSTRACT

A hammer actuates a piston in a rapid response trigger to depressurize a control chamber, opening a path from a high pressure chamber to an exit conduit. The hammer acts in line with, but in opposition to, a spring biasing the control chamber closed using a centrally disposed piston. By aligning the spring, piston, and hammer in the same line of force, the response to the hammer is both more reliable and faster that prior triggers.

1 Claim, 11 Drawing Sheets

RAPID RESPONSE TRIGGER

BACKGROUND

1. Technical Field

The present invention relates generally to fluid flow control devices, more particularly to a rapid response pressure valve used for a trigger or the like.

2. Description of Related Art

Fluid valves are well known in the art for control of an actuating gas or liquid flow. The use of ball valves, butterfly valves, poppet valves and plug valves are examples of common fluid valves. Some of these examples are intended for control of movement of a gas or liquid flow by opening or closing a flow passage. Others regulate a flow of a actuating medium by changing a flow direction. In some gun actuation systems, valves are used in the firing of the gun to control a high pressure gas in order to present a rapid response to a trigger actuation. For example, there are examples of air guns that employ a quick response valve by opening a gas flow passage for a specified time, but users in this art are always looking for ways to reduce the delay response, and many high-speed valves are not able to provide both a rapid response on opening and on closing.

An example of the type of valves that are the subject of the present invention is disclosed in U.S. Pat. No. 9,822,893 to Kunau entitled "RAPID OPENING GAS VALVE," the content of which is incorporated herein by reference. Kunau teaches that by having a simple valve that could open more quickly than conventional ball valves or butterfly valves of conventional designs, a smaller, more easily portable pressurized vessel can be used. The pneumatically controlled, rapid-opening, gas valve is designed for a bead seating tool The concepts of the prior art can still lead to issues with a reliable and rapid response trigger, including an undesirable lapse between application of the contact and actuation of the valve. The present invention is intended to improve on the prior art systems and provide a more reliable and more rapid response to the trigger of the prior art.

SUMMARY OF THE INVENTION

A hammer actuates a piston in a rapid response trigger to depressurize a control chamber, opening a path from a high pressure chamber to an exit conduit. The hammer acts in line with, but in opposition to, a spring biasing the control chamber closed using a centrally disposed piston. By aligning the spring, piston, and hammer in the same line of force, the response to the hammer is both more reliable and faster that prior triggers.

The valve operation is actuated by a pressure differential across the valve, reducing a force to actuate the trigger, and thereby improve the dynamic characteristics of the valve. To increase the accuracy, the present invention includes a control mechanism that transfers the pressure line of force to the direction of the valve opening or closing. To this end, the valve assembly includes main plug valve, placed in a housing with a pressured actuating medium such as high pressure gas. The main valve closes the outlet port, preventing the actuating medium from escaping. The movements of the main valve are limited by the housing. The change of opening and closing pressure balance is managed by the control mechanism, which includes a piston and the exhaust port, placed in the housing, the control chamber, formed by the control chamber enclosure, a spring, and a hammer. The piston closes the exhaust port, preventing the exhaust of actuating medium from the control chamber to the atmosphere. The movement of the piston under the influence of the hammer causes a change of pressure in the control chamber, which brings a change in the ratio between opening and closing pressures. By assigning the piston movement it is possible to control the condition of the valve and, thus, change the flow of the actuating medium from the housing to the outlet port.

DETAILED DESCRIPTION OF THE PREFERRED EMBODIMENTS

Figure 1:
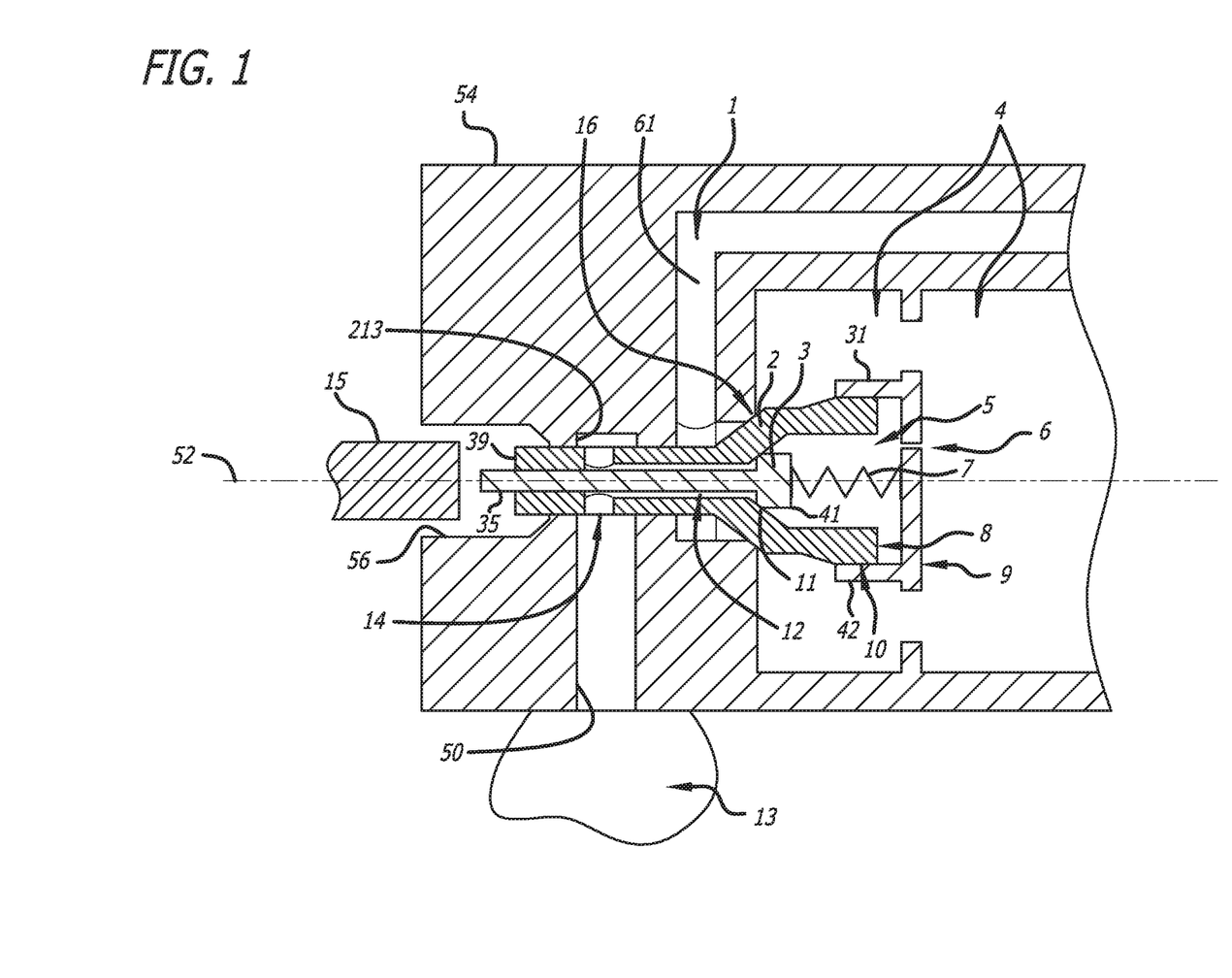
FIG. 1 shows a schematic diagram of a first preferred embodiment of the present invention in an initial, closed state.

FIGS. 1-5 show in schematic form an implementation of an embodiment of the present invention. The figures illustrate a sequence that can implement a trigger actuation, where a valve changes from an initially closed state in FIG. 1 to an open state, and then to commencement of a closing state in FIG. 5. A list of elements depicted in FIGS. 1-5 include:

The embodiment of FIG. 1 illustrates a hammer 15 that may be part of a trigger mechanism (not shown). The hammer is disposed adjacent the housing 54 of a rapid response assembly, wherein the hammer 15 is configured to translate axially within the hammer access cavity 56 of the housing along the centerline 52. Within the housing 54 is the main valve 2 translating within a central bore 213, the valve 2 having a central passage 12. The valve 2 has a proximal end disposed within the hammer access cavity 56 and a distal end 8. A radially disposed control cavity exhaust port 50 in the housing 54 opens to the atmosphere 13 and is in fluid communication with the central passage 13 of the valve 2 through a bypass port 14. The valve 2 radially expands at a distal end 8 in both the inner and outer radii, the distal end extending into an enclosure 9 that forms the control chamber 5. The enclosure 5 includes a peripheral wall 31 that conforms with and seals the outer surface of the distal end 8 of the valve 2. The inner surface of the distal end 8 forms a conically shaped piston seat 11 at the mouth of the central passage 12.

Inside the central passage 12 of the valve 2 is an elongate piston 3. The piston 3 comprises a shaft and a head, where the proximal end 35 of the shaft protrudes from the valve's proximal end 39 in the hammer access cavity 56, and the piston head 41 is seated against the central passage 12 within the radially expanded portion of the distal end 8 of the valve 2. The shape and size of the piston head 41 is selected to fit tightly against the piston seat 11, and in the closed condition (see FIG. 1) the piston seals the control chamber 5 and prevents gas from escaping the control chamber 5 through the central passage 12.

Figure 11:
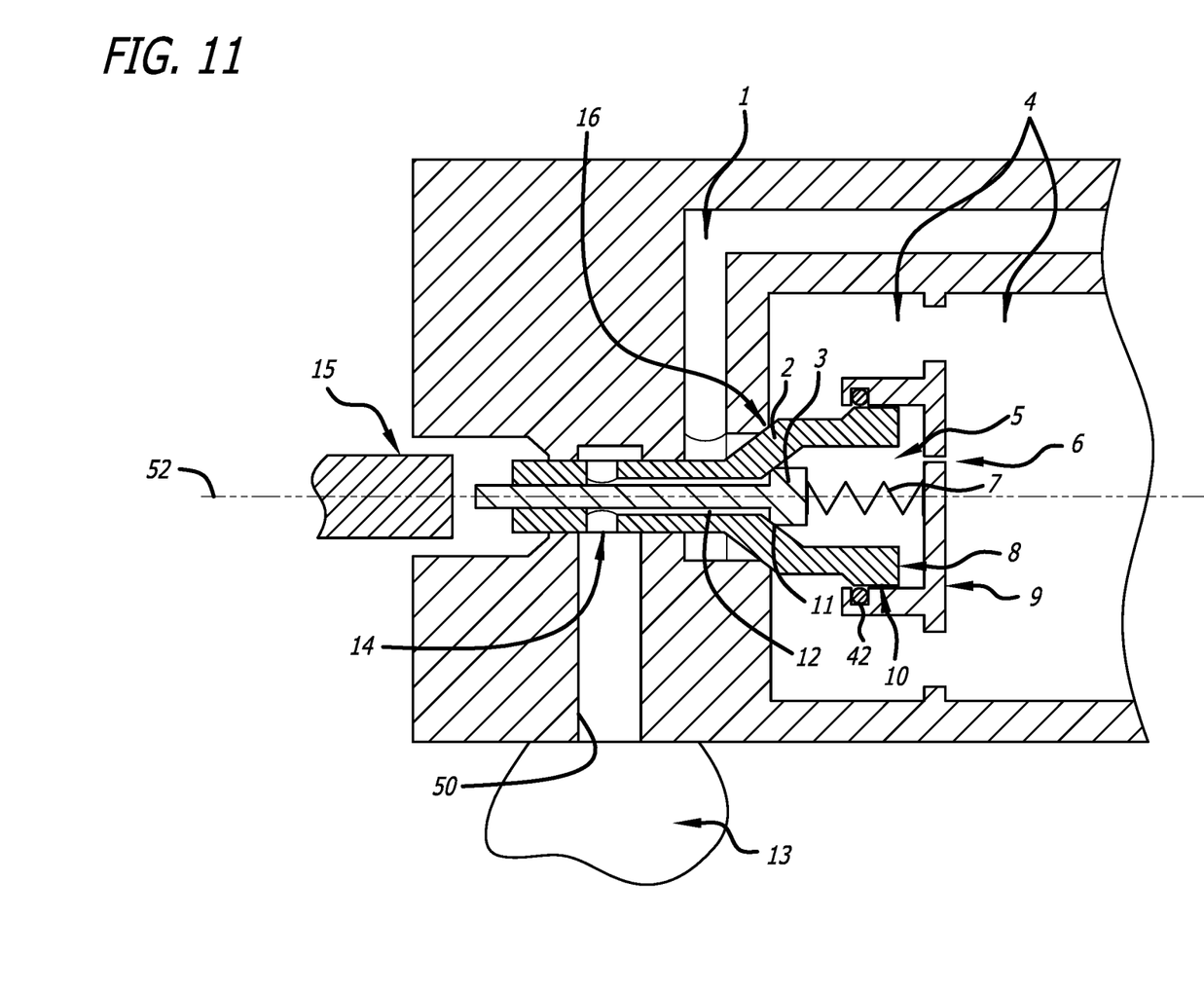
FIG. 11 is a schematic diagram of a cross-section of a second embodiment of the present invention.
Figure 12:
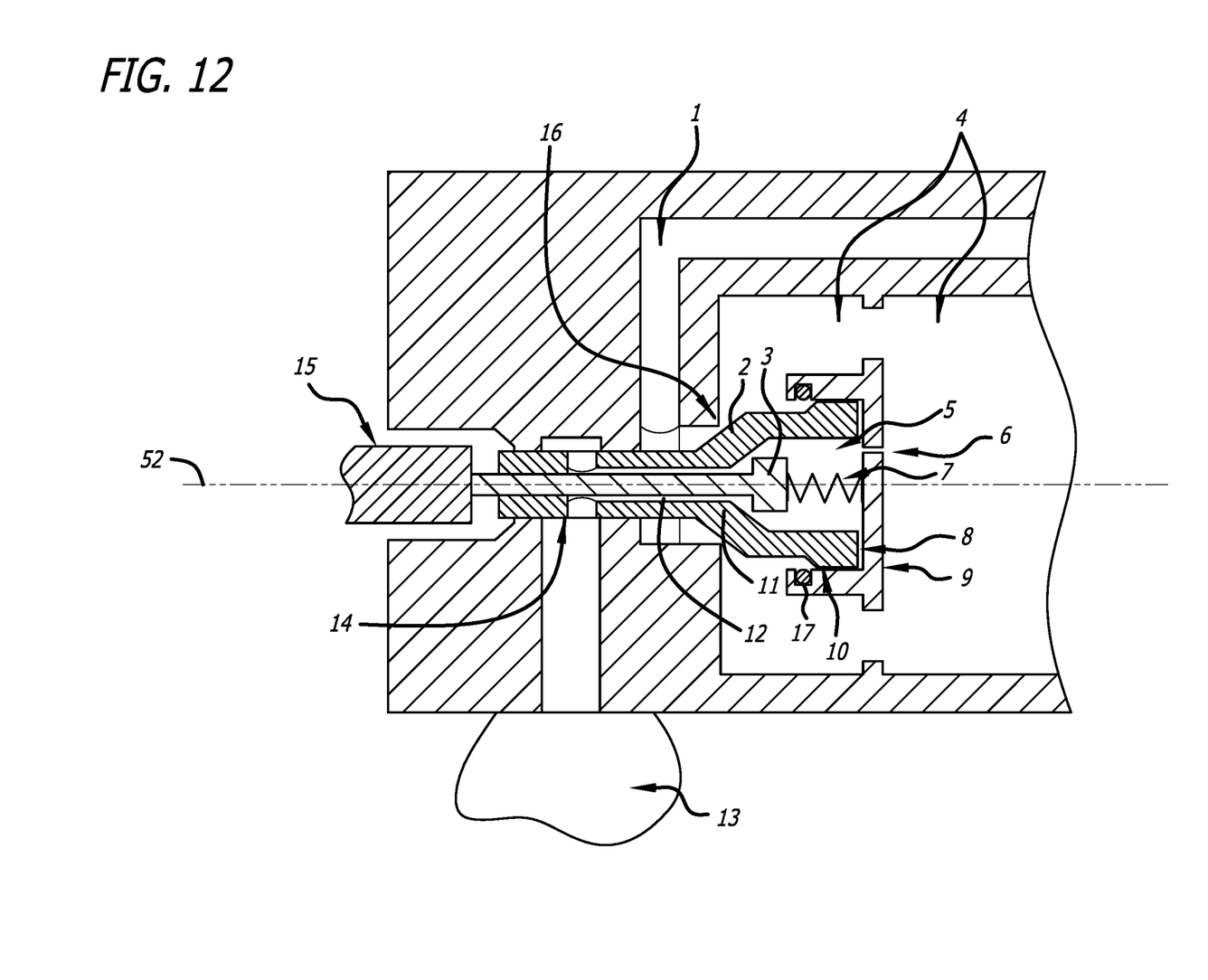
FIG. 12 is a schematic diagram of the cross-section of the embodiment of FIG. 11 during opening.

The embodiment further comprises a high pressure chamber 4, which may be connected to a tank, canister, or other source of high pressure medium. The distal end 8 of the main valve 2 is located within the control chamber 5, which itself is within the high pressure chamber 4. The enclosure 9 comprises a plate that is perpendicular to the longitudinal axis 52, and further comprises a peripheral wall 42 that forms an outer seal with the distal end 8 of the valve 2. In some embodiments, air can seep into the control chamber between the peripheral wall 42 and the end 8 of the valve 2, and in other embodiments the seal is air tight. In the sealed embodiments, the seal may be achieved by an O-ring with a close tolerance fit. A gasket 17 embodiment is also shown in FIGS. 11 and 12.

The housing 54 further defines a high pressure conduit inlet 16 that, in a closed embodiment (see FIG. 1) is closed by engagement with the radially expanded valve distal end 8. The inlet 16 is beveled to mate with the exterior surface of the valve 2, in order to center the valve. The outer wall of the main valve 2 and the beveled inlet 16 of the high pressure conduit 1 form an airtight seal when the main valve is forced against the inlet, as by the force of the spring 7 against the valve 2. The high pressure conduit includes a transition segment 61 and an exit channel 1 that leads to a distal outlet nozzle or port (not shown). When the main valve 2 is moved distally away from the high pressure conduit inlet 16, pressurized gas in the high pressure chamber 4 flows through the inlet 16, through the transition segment 61, and down the exit channel 1 to perform the intended function of the embodiment of the invention, such as driving a pellet from an air gun, or similar action.

The enclosure 9, which forms part of the control chamber 5, has a small pinhole aperture 6 that connects the tank 4 with the control chamber 5. The aperture 6 may be fitted with a flexible interior membrane that permits fluid flow from the high pressure chamber 4 to the control chamber 5. Thus, when the high pressure chamber 4 is pressurized with a gas to a certain pressure, the control chamber 5 will relatively slowly fill with the same gas to the same pressure via the aperture 6.

It will be appreciated that an elevated pressure in the control chamber 5 tends to force both the main valve 2 and the piston 3 into the closed condition seen in FIG. 1, such that seals are formed between the piston 3 and the main valve 5 through the piston seat 11, and also between the main valve 2 and the inlet 16.

A compression spring 7 extends between the piston 3 and the enclosure 9 so as to bias the piston 3 in a proximal direction against the piston seat 11 and along the longitudinal axis 52 of the central bore and the central passage 12. It will be appreciated that the spring 7, through force applied on the piston 3, also biases the main valve 2 into the main valve seat 16 via the force applied on the piston head 41. Thus, the main valve 2 closing force is provided by both the pressurized control chamber 5, and also by the spring 7. In a starting condition, which is shown in FIG. 1, the valve is in a closed condition. The piston 3 is held closed by the spring 7 against the piston seat 11. The control chamber 5 is filled under pressure with the high pressure gas via aperture 6 from the high pressure chamber 4, which also tends to force the valve 2 against the inlet 16.

The main valve 2 is oriented in the housing in such a way that, in the closed position, the flow of the working medium is blocked from moving through the high pressure conduit exit channel 1. This is a result of the main valve's 2 position bearing against the inlet 16. The movement of the main valve 2 is the distal direction is limited by the enclosure 9. The peripheral wall 31 along with the enclosure, the inner wall of the distal end 8 of the valve, and the piston head 41, define the control chamber 5. In the closed position the piston head 41 bears against the piston seat 11 and blocks the actuating medium in the control chamber 5 from passing through the central passage 12, located inside the main valve body 2. In the body of the main valve 2, there are bypass ports 14 that connects the central passage 12 to the exhaust port 50 that empties in the atmosphere 13. The flow of the gas from the high pressure chamber 4 to the control chamber 5 is carried out through the control chamber filling port 6 and the gap 10 between the peripheral walls 42 of the enclosure 9 and the distal end 8 of the main valve 2.

The movement of the piston 3 inside the main valve body 2 in the direction of opening is carried out under the actuation of the distal movement of the hammer 15. In the direction of closing, the movement of the piston is guided by the influence of spring 7 and pressure of the actuating medium in the control chamber 5.

The opening-closing cycle of the valve can be conditionally divided into seven time increments or phases, marked with numerals from I to VII of FIGS. 6-10. The graphs of FIGS. 6-10 illustrate some characteristics of the valve structure during the functioning, as explained more fully below.

Phase I is characterized by the closed position of the piston 3, without the influence of the hammer 15 and the positive pressure in the high pressure chamber 4 compared with atmospheric pressure. In this case, the stable position of the main valve 2 is formed in the closed position, which is shown on FIG. 1. In this position, there is a constant actuation force in the closing direction of the main valve 2 (shown as "I" in FIG. 6), the pressure in the control chamber 5 and in the high pressure chamber 4 are equal (phase I at FIG. 7 and FIG. 10), the central passage pressure is atmospheric (phase I at FIG. 9), and main valve 2 does not move (phase I of FIG. 8). In this state, the closure force of the main valve 2 is formed by spring 7 and the pressure in the control chamber 5 acting on the area of the outlet 16.

Figure 2:
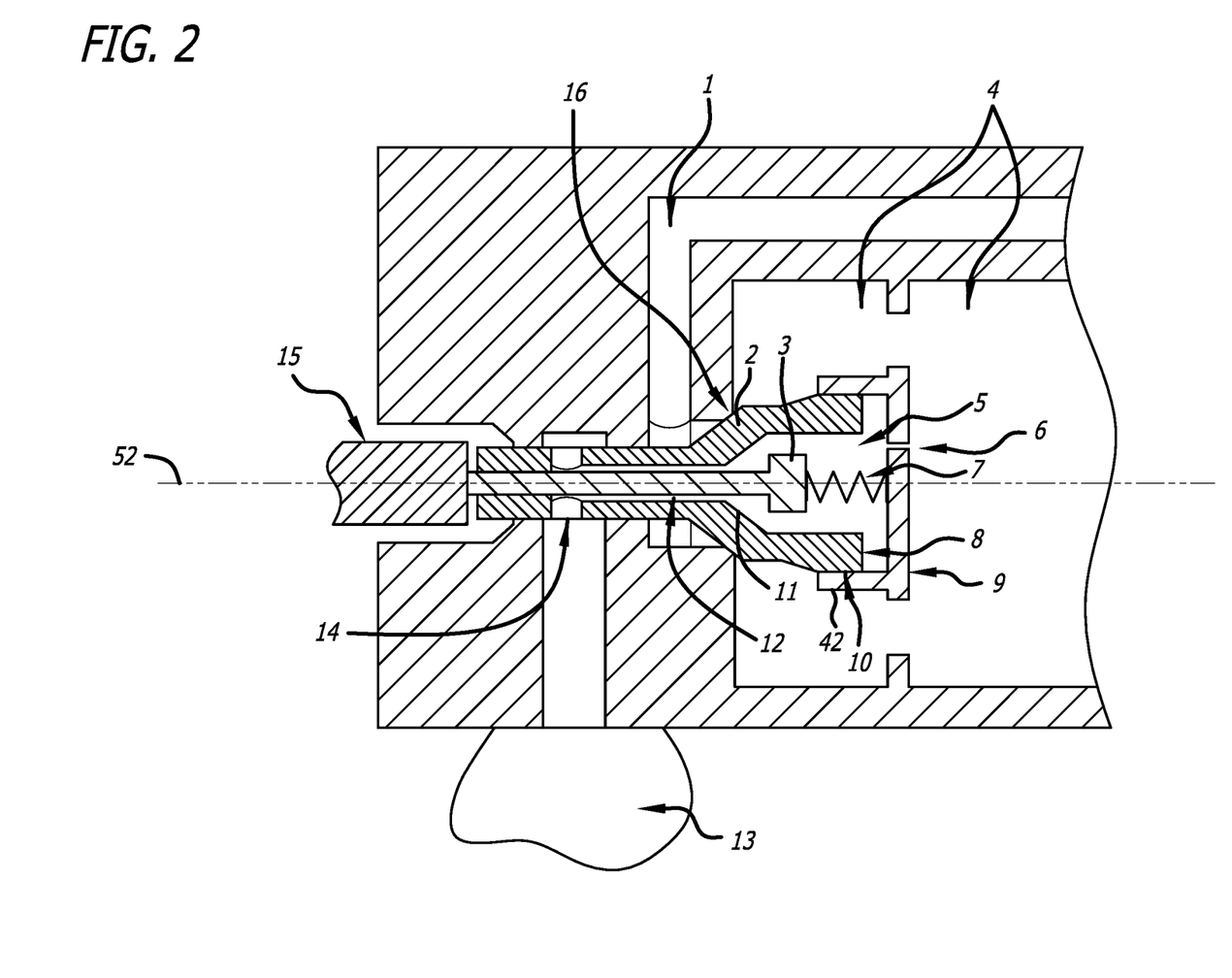
FIG. 2 is a schematic diagram of the embodiment of FIG. 1 at the beginning of valve opening.

To open the main valve 2, it is necessary to overcome the static closing force illustrated in FIG. 1. This may be achieved by reducing the pressure in the control chamber 5 by the distal movement of the piston 3 though the influence of the hammer 15. The beginning of the opening cycle of the main valve 2 is schematically shown in FIG. 2. Movement of the hammer 15 causes the piston to move distally, and the piston head 41 is released from its valve seat 11 via the force applied at the proximal end by the hammer 15 (phase II). Here, the actuating medium under pressure bypasses the piston head 41 that is no longer blocking the central passage 12, and the gas in the control chamber rapidly moves down the central passage 12 where it exits the bypass port 14 and exits to the atmosphere 13 through exhaust port 50. This gas escape reduces the pressure in the control chamber 5, corresponding to phase II of FIG. 7. This pressure reduction in the control chamber 5 proceeds until the pressure is reached where the pressure in the control chamber 5 is equal to the atmospheric pressure (не верно, не атмосферному, а некоторому давлению(больше атмосферного, но меньше чем в объёме 4)) (point A on FIG. 7), at which the balance of opening and closing forces on the main valve 2 is achieved (point A on FIG. 6). The pressure reduction in the control chamber 5 is accompanied by an increased inflow of the actuating medium from the high pressure chamber 4 through the control chamber filling port 6 and the joint gap 10. To ensure the working capacity of the structure it is necessary that the flow rate of the actuating medium through the control chamber filling port 6 and the joint gap 10 is much less than the flow rate of the gas through the central passage 12. This is achieved by selecting the area of the filling port 6 in specific implementation of the proposed construction.

Figure 3:
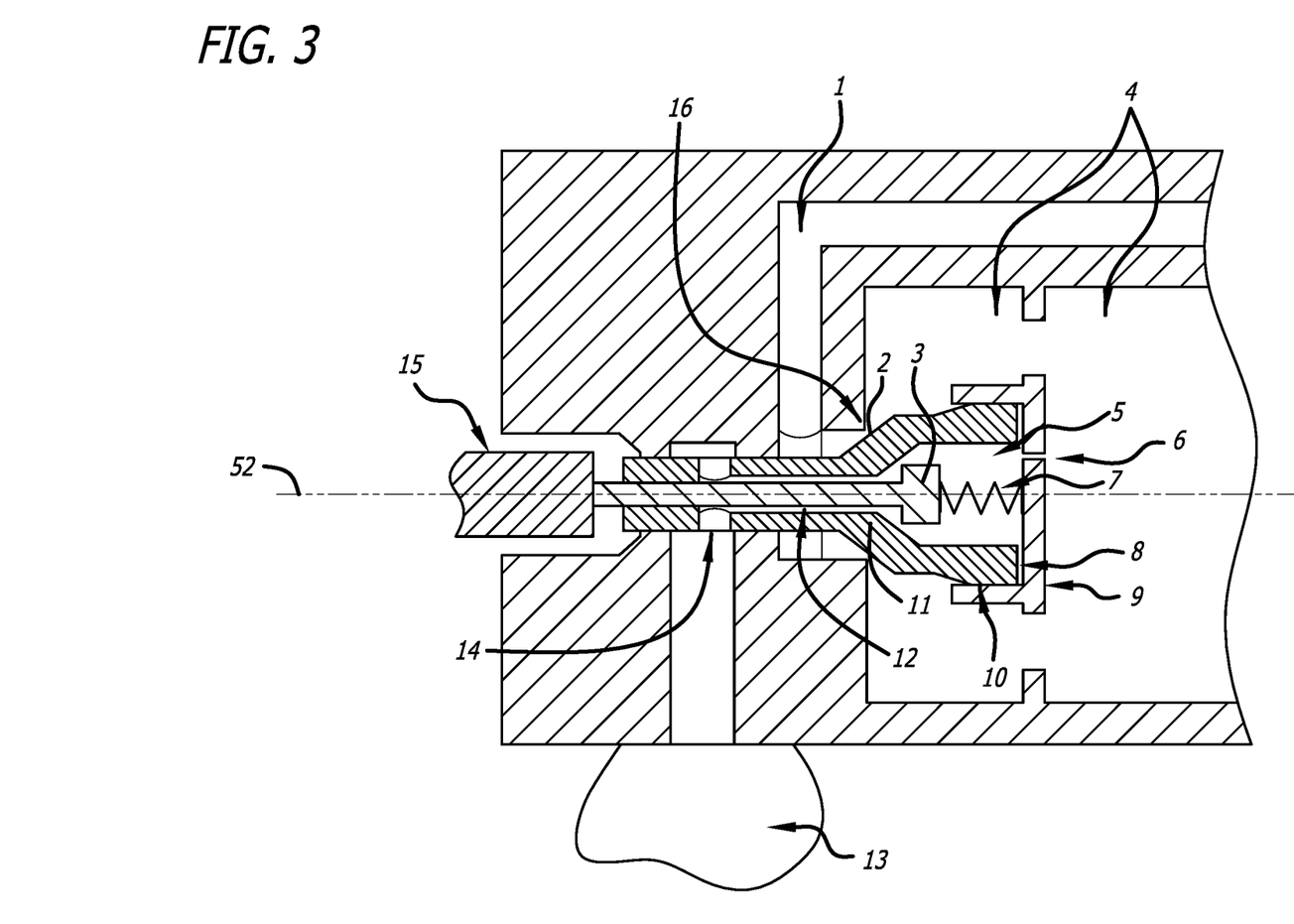
FIG. 3 is schematic diagram of the embodiment of FIG. 1 during opening.
Figure 4:
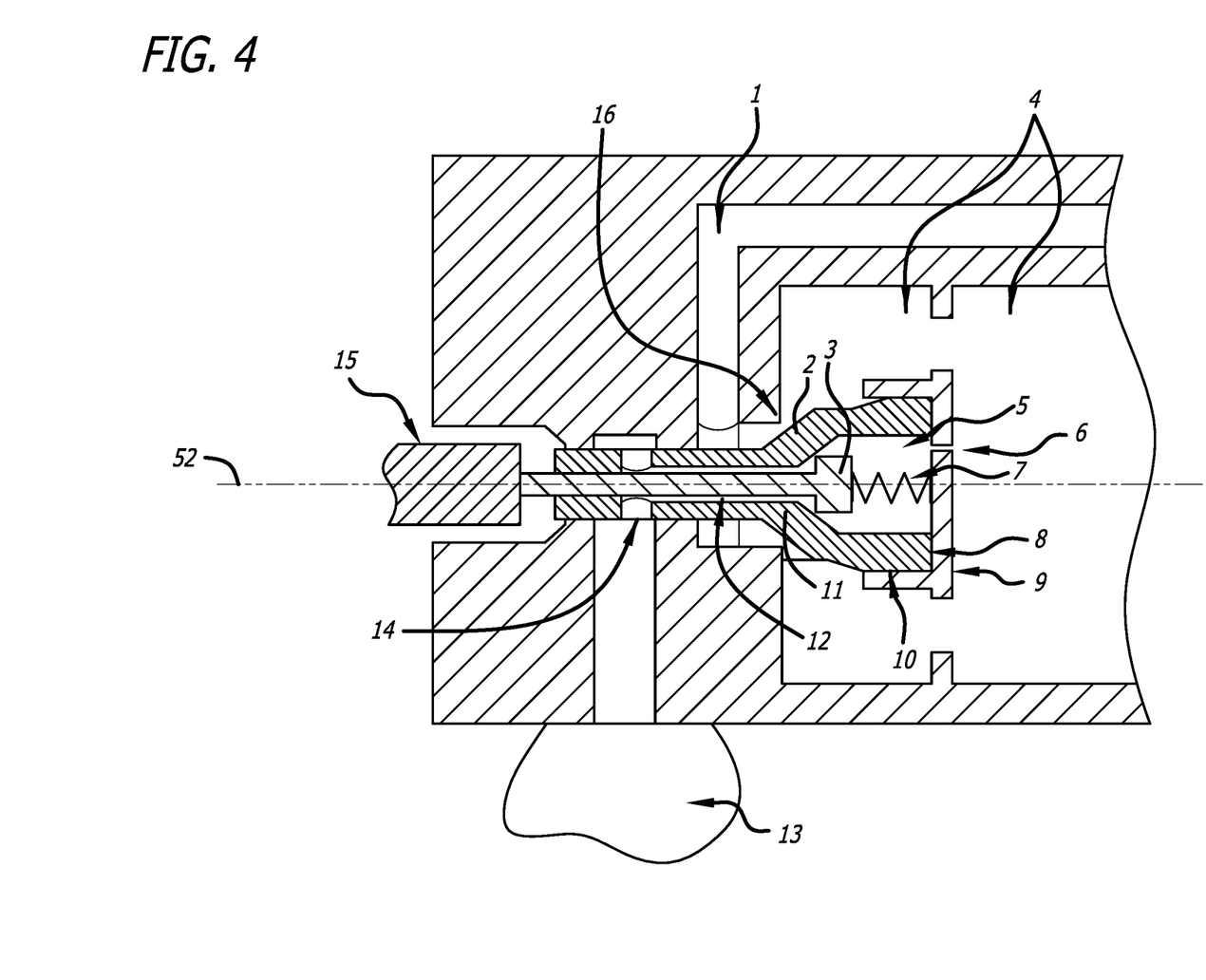
FIG. 4 is a schematic diagram of the embodiment of FIG. 1 in the open state.
Figure 6:
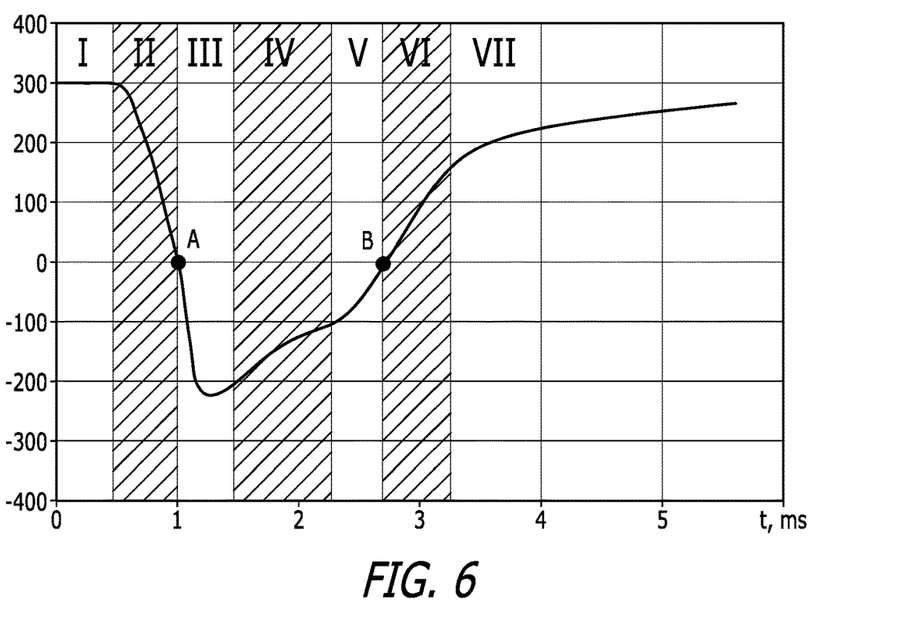
FIG. 6 is a graph of the total force applied to the center of mass of the valve during the opening-closing cycle (positive value-closing, negative value-opening).
Figure 7:
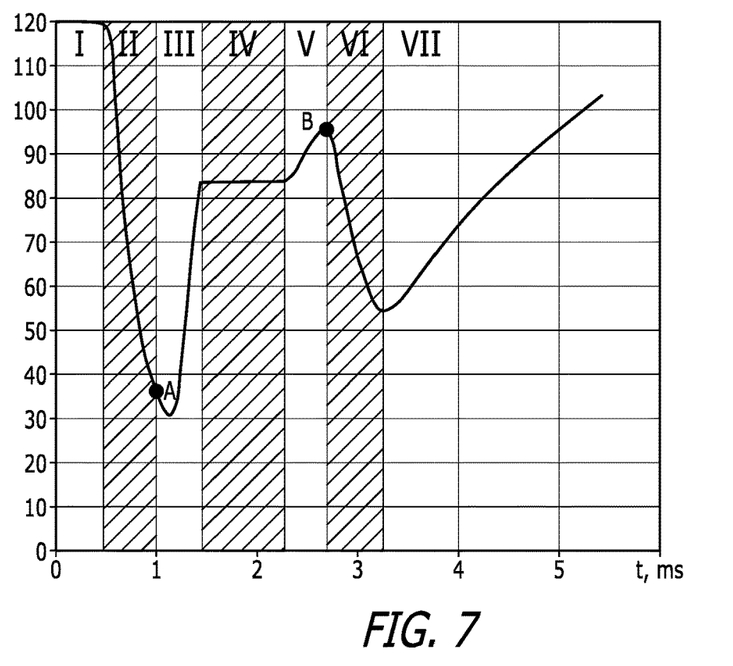
FIG. 7 is a pressure graph in the control chamber during the valve opening-closing cycle.
Figure 8:
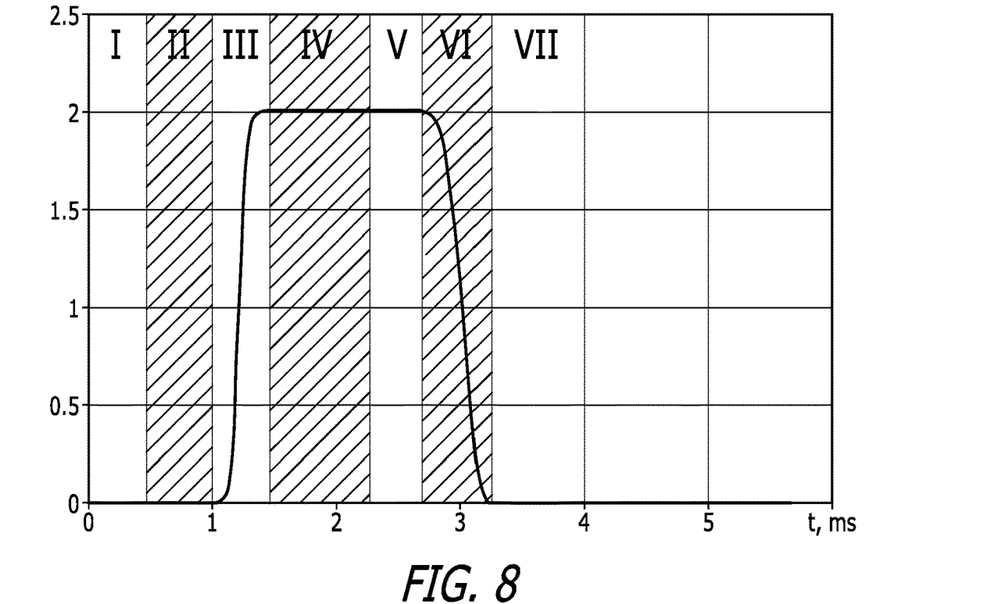
FIG. 8 is a graph of the valve horizontal position (center of mass coordinates) change during the opening-closing cycle.
Figure 9:
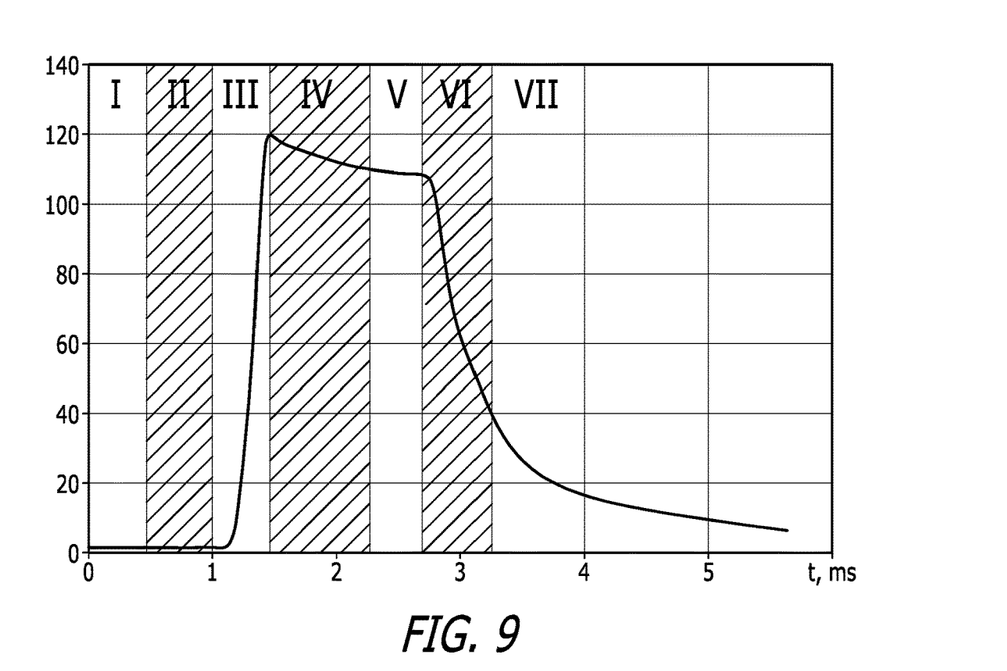
FIG. 9 is a pressure versus time graph of the outlet port during the opening-closing cycle.
Figure 10:
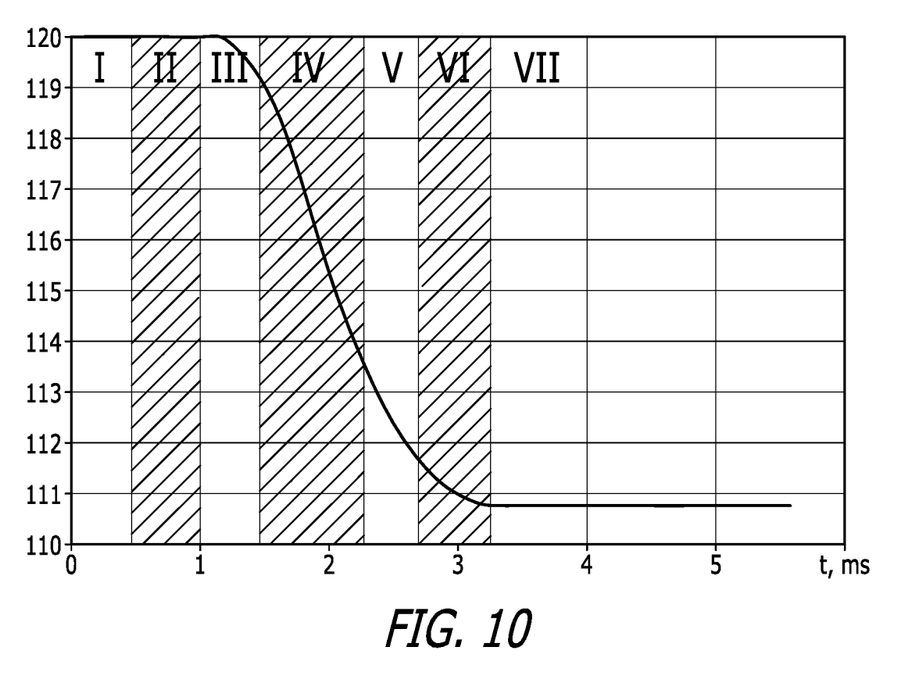
FIG. 10 is a pressure graph in the high pressure chamber during the opening and closing cycle.

At reduction of the pressure in the control chamber 5, the embodiment transitions to phase III in which the opening force on the main valve 2 (due to the pressure differential between the control chamber 5 and the high pressure chamber 4) begins to exceed the force acting on its closing (phase III on FIG. 6). The opening force, i.e., the pressure differential, acts on the main valve 2 to drive the main valve 2 distally into the control chamber 5 and off of the high pressure conduit inlet 16 (phase III in FIG. 8), opening a path for the outflow of the actuating medium from high pressure chamber 4 to the high pressure conduit exit channel 1, as shown in FIG. 3. The outflow of the actuating medium is accompanied by an increase in the pressure in the exit channel 1 (phase III in FIG. 9) and by a decreased pressure in the high pressure chamber 4 (phase III in FIG. 10). The movement of the main valve 2 into the control chamber 5 reduces the volume of the control chamber 5, reducing the gap between the piston head 41 and the piston seat 11, which in turn causes an increase in the pressure in the control chamber 5 (phase III of FIGS. 7, 10). This process continues until the main valve 2 is fully open as shown in FIG. 4.

At contact of the main valve distal end 8 with the enclosure's end wall, the process of the opening of the main valve 2 stops, and the process transitions to phase IV. At the fully opened main valve 2 the pressure in the exit channel 1 tracks the pressure in the high pressure chamber 4 and changes according to the change of this pressure (phase IV in FIGS. 9 and 10). Here, the pressure in the control chamber 5 changes slightly (phase IV in FIG. 7), and the pressure decrease in the high pressure chamber 4 and the exit channel 1 causes a reduction in the opening force on the main valve 2 (phase IV in FIG. 6). The duration of the main valve 2 in the fully open state (phase IV) can be changed by changing the position of the piston 3. Opening of the piston 3 causes a pressure decrease in the control chamber 5 and increases the duration of the main valve 2 in the open state. Thus, the dosing of the actuating medium is set by the position of the piston 3.

Figure 5:
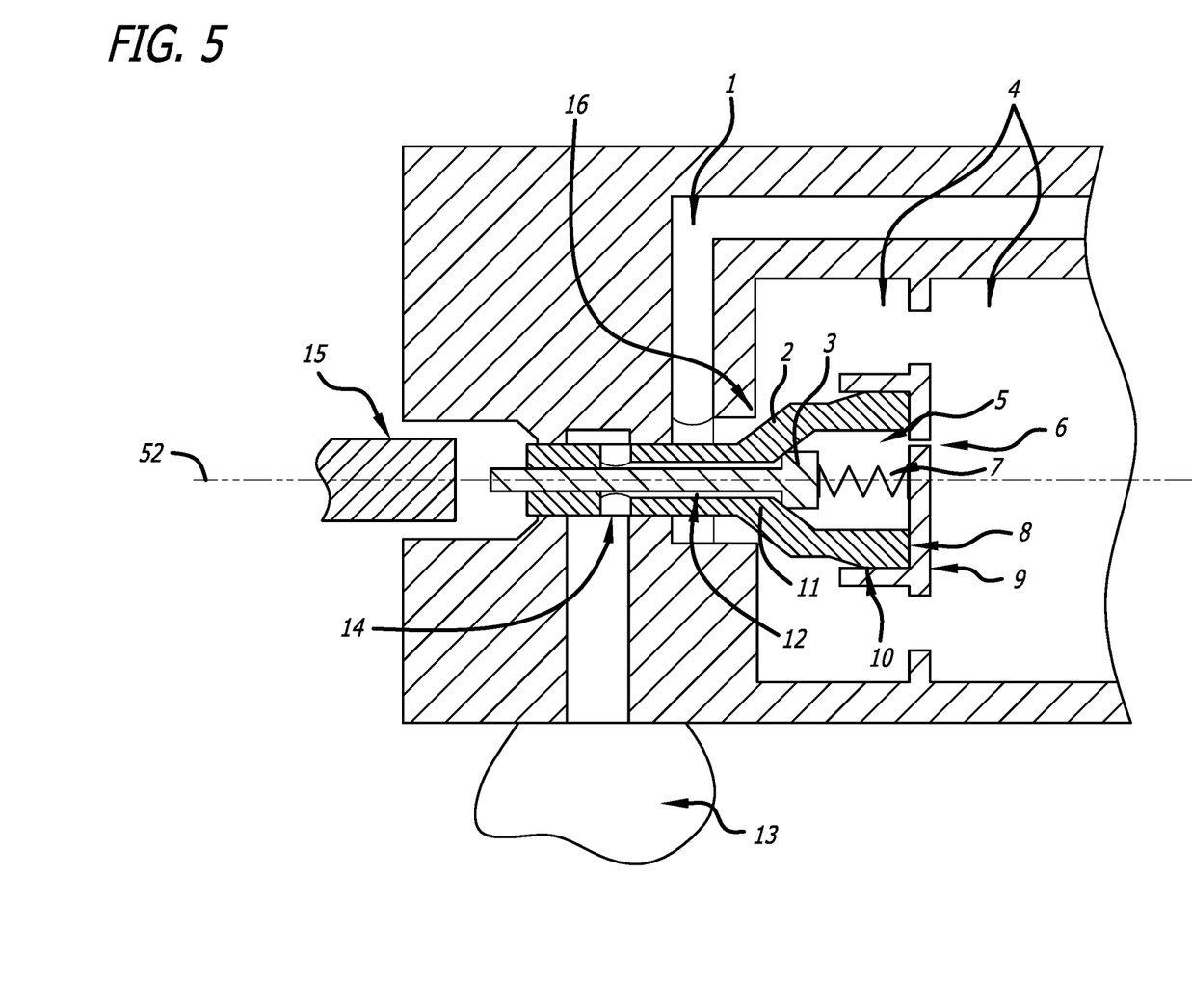
FIG. 5 is a schematic diagram of the embodiment of FIG. 1 at the beginning of closing.

To return the main valve 2 to the closed position it is enough to remove the influence of the hammer 15 from the piston 3 (FIG. 5). Removing the force of the hammer allows the spring 7 to push the piston 3 against the valve seat 11.

This causes a closing of the control chamber 5 (phase V) and the cessation of the outflow of the actuating medium from the control chamber 5 to the atmosphere 13. The pressure in the control chamber 5 therefore increases (phase V on FIG. 7), and this process is accompanied by an increase in the closing force acting on the main valve 2 (phase V on FIG. 6). The build-up of pressure in the control chamber 5 continues until the opening and closing forces equalize on the main valve 2 (point B in FIGS. 6 and 7), supplemented by the force of the spring 7.

Once the closing force on the main valve exceeds the opening force (phase VI in FIG. 6), the main valve 2 closes again (phase VI in FIG. 8) against the inlet 16 of the high pressure conduit. When the main valve 2 closes the inlet 16, the flow of the actuating medium from the high pressure chamber 4 to the exit channel 1 stops, which is accompanied by a pressure drop in the outlet port 1 (phase VI on FIG. 9). The closing of the main valve 2 also increases the volume in the control chamber 5, leading to a drop in the pressure (phase VI in FIG. 7). The pressure drop in the high pressure chamber 4 as the main valve closes again slows down (phase VI in FIG. 10).

As the main valve 2 moves proximally until its bears against the inlet 16, the flow of the actuating medium from high pressure chamber 4 to the exit channel 1 ceases and the stable closed condition of FIG. 1 is reestablished. In the closed position of the main valve 2 the pressure in the control chamber 5 begins to increase gradually (phase VII in FIG. 7) due to the inflow of the actuating medium from the high pressure chamber 4 through the control chamber filling port 6 and, in some cases, the joint gap 10. The pressure in the exit channel 1 decreases until the atmospheric pressure value is reached (phase VII in FIG. 9). These actions serve to increase the closing force acting on the main valve 2 (phase VII in FIG. 6). To repeat the opening-closing cycle, the piston 3 should be moved to the open position by moving the hammer 15. This will repeat phases I to VII.

In some applications, which are characterized by the key operating mode of the valve, it is beneficial to have a minimum time of valve transition from the closed state to the open and back. In the depicted embodiment, the time of transition from closed to open state (duration of phases II and III on FIGS. 6-10) depends on the ratio between the total section of the filling passages (the control chamber filling port 6 and the joint gap 10) from the high pressure chamber 4 to the control chamber 5 and the section of the central passage port 12. If there is an increase in the area of the central passage 12, then the opening time of the valve decreases. If there is an increase the area of the control chamber filling port 6 or the joint gap 10 (or both), then the opening time of the valve increases corresponding to phases II and III of FIGS. 6-10.

Also, the duration of valve opening depends on the volume of the control chamber 5 and the area of the filling passages (the control chamber filling port 6 and the joint gap 10) of the control chamber 5. Thus, in order to reduce the opening time of the main valve 2, it is necessary to either decrease the area of the filling passages (the control chamber filling port 6 and the joint gap 10) from the high pressure chamber 4 to the control chamber 5, or increase the area of the central passage port 12 from the control chamber 5 to the atmosphere 13. But, the reduction of the area of the filling passages increases the closing time (the duration of phases V and VI in FIGS. 6-10) of the main valve 2. Further, when the area of the central passage 12 is increased, the force required for controlling the piston 3 also increases.

Reducing the opening time without the aforementioned disadvantages is possible at the expense of a variable area of influx from the high pressure chamber 4 to the control chamber 5. For this purpose it is necessary to add an auxiliary valve that changes the area of the filling passages 5 depending on the position of the main valve 2. The auxiliary valve should increase the area of the filling passages when opening the main valve 2.

Figure 13:
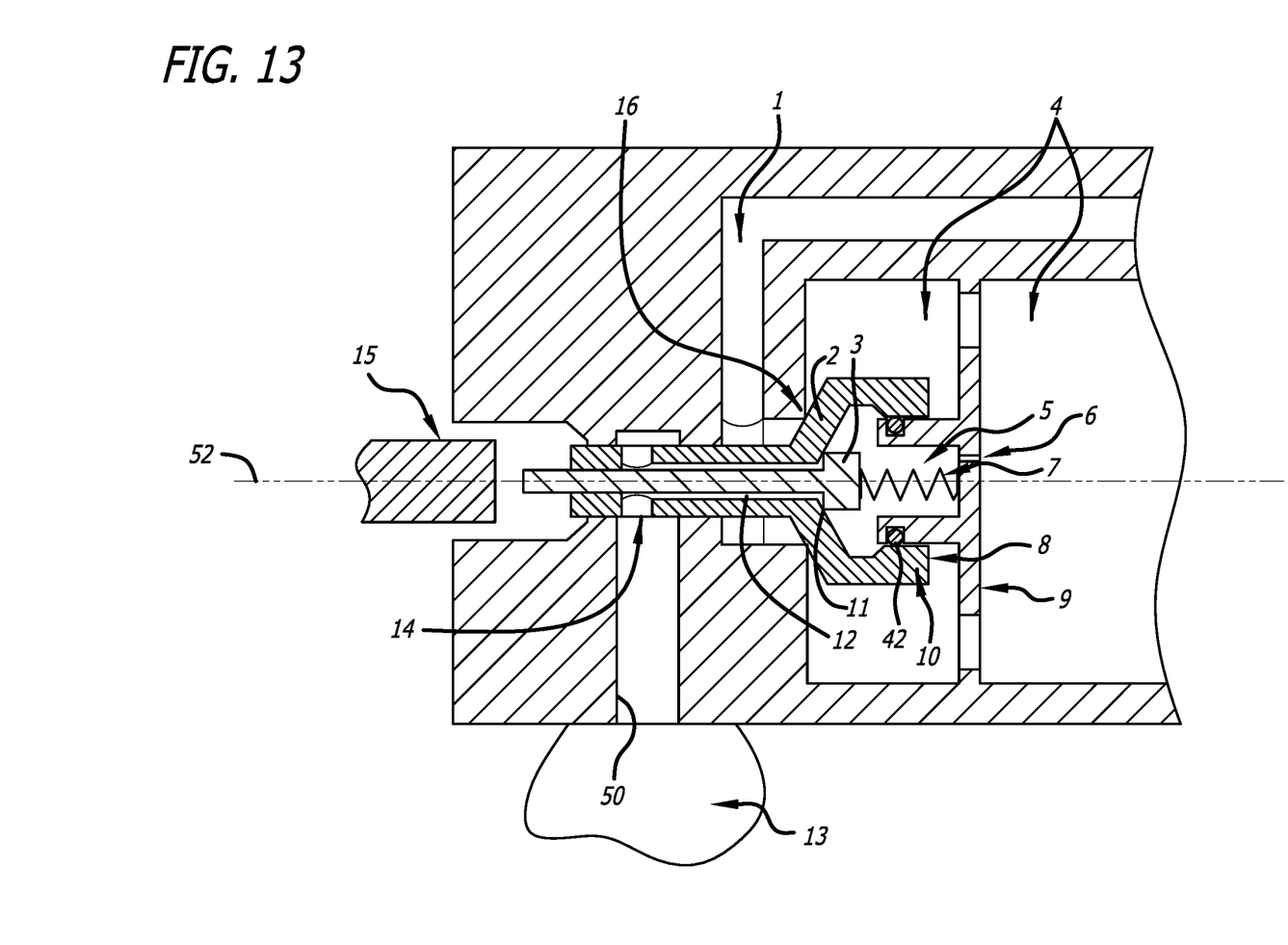
FIG. 13 is a schematic diagram of an alternate embodiment where the O-ring engages the main valve at an inner surface.

An alternate embodiment is shown in FIGS. 11-13. Adding an O-ring 17 closes the joint gap 10 between the distal end 8 of the main valve 2 and the peripheral wall of the enclosure 9 in the closed state of the construction. In this case, the inflow of the actuating medium into the control chamber 5 is carried out only through the control chamber filling port 6. The opening of the main valve 2 stops the contact of the O-ring 17 with the distal end 8 of the main valve 2. In FIG. 12, the opening of the main valve 2 past the O-ring 17 is shown, leading to an increase in the opening speed of the main valve 2 without reducing the rate of its closing speed, which helps to improve the dynamic characteristics of the structure. FIG. 13 depicts an alternate embodiment where the seal engages the interior wall, rather than the exterior wall, of the valve.

While specific embodiments of the invention have been described and depicted, the invention is not limited to the described and depicted embodiments only unless expressly limited herein. Rather, one of ordinary skill in the art will readily appreciate many modifications and substitutions to the foregoing described embodiments, and the scope of the invention is intended to include all such modifications and substitutions. Accordingly, the scope of the present invention is properly governed by the appended claims, and not by any specific depiction or description herein.

The invention claimed is:

1. A rapid response trigger mechanism, comprising:
   a housing comprising a hammer entrance recess at a proximal end, said hammer entrance recess open to an ambient atmosphere, a high pressure chamber inside the housing and including a annular enclosure wholly inside the high pressure chamber and exposed on all sides to the high pressure chamber, the housing further comprising a high pressure conduit fluidly connecting the high pressure chamber to the ambient atmosphere, the housing further comprising a control cavity exhaust port disposed distal to the hammer entrance recess and proximal to the high pressure conduit entrance;
   a hammer disposed outside the housing and configured for reciprocation within the hammer entrance recess;
   a piston comprising a piston shaft and a piston head, the piston shaft having a proximal end opposed and spaced from the hammer within the hammer entrance recess and exposed to the ambient atmosphere;
   a valve having a proximal end within the hammer entrance recess and exposed to the ambient atmosphere and a distal end disposed in the high pressure chamber and having a central bore configured to receive the piston reciprocating therein, a distal end of the valve cooperating with the annular enclosure to define a control chamber, the valve further comprising a valve bypass port disposed distal to the hammer entrance recess and proximal to the high pressure chamber, the valve bypass port establishing a passage from the high pressure chamber through the central bore to the control cavity exhaust port;
   a spring disposed in the control chamber and in contact with the piston head and an inner wall of the annular enclosure to bias the piston away from the high pressure chamber;
   a spring biasing the piston head against the central passage;
   wherein the valve is forced against the high pressure conduit to seal the high pressure conduit, and the piston head is forced against the central bore of the valve to close the control chamber to the central bore when a pressure above atmospheric pressure is reached in the control chamber;
   wherein flow from the high pressure chamber to the control chamber is adjusted by an orifice in the annular enclosure and a gap between the annular enclosure and a distal end of the valve;
   wherein release of pressure in the control chamber resulting from the hammer contacting the proximal end of the piston, moving the piston head away from the central bore, is achieved by gas exiting the control chamber through the exhaust exit port via the central bore; and
   wherein said release of pressure in the control chamber increases a flow rate from the high pressure chamber to the control chamber through the orifice and the gap, said flow rate less than a flow rate from the control chamber to the central bore; and
   wherein the release of pressure in the control chamber causes the valve to unseat from the high pressure conduit to open a path from the high pressure chamber to ambient.

* * * * *